United States Patent
Nam et al.

(10) Patent No.: US 9,164,212 B2
(45) Date of Patent: Oct. 20, 2015

(54) HIGH LUMINANCE POLARIZING PLATE, METHOD OF MANUFACTURING THE SAME, AND DISPLAY USING THE POLARIZING PLATE

(71) Applicant: LG CHEM, LTD., Seoul (KR)

(72) Inventors: Sung-Hyun Nam, Daejeon (KR); Kyun-Il Rah, Daejeon (KR)

(73) Assignee: LG CHEM, LTD., Seoul (KR)

( * ) Notice: Subject to any disclaimer, the term of this patent is extended or adjusted under 35 U.S.C. 154(b) by 139 days.

(21) Appl. No.: 13/904,631

(22) Filed: May 29, 2013

(65) Prior Publication Data
US 2014/0204460 A1 Jul. 24, 2014

(30) Foreign Application Priority Data

May 30, 2012 (KR) .................. 10-2012-0057582
May 28, 2013 (KR) .................. 10-2013-0060151

(51) Int. Cl.
*G02B 5/30* (2006.01)
*G02B 1/10* (2015.01)

(52) U.S. Cl.
CPC .............. *G02B 5/3083* (2013.01); *G02B 5/305* (2013.01); *G02B 1/105* (2013.01); *G02B 5/3058* (2013.01); *Y10T 156/10* (2015.01)

(58) Field of Classification Search
CPC ...... G02B 5/3083; G02B 5/305; G02B 1/105; G02B 5/3058; Y10T 156/10
USPC .................................. 359/489.07; 349/96
See application file for complete search history.

(56) References Cited

U.S. PATENT DOCUMENTS

| 7,443,585 B2 * | 10/2008 | Hara et al. ............... 359/489.15 |
| 2006/0028601 A1 * | 2/2006 | Kawahara et al. ........... 349/117 |

FOREIGN PATENT DOCUMENTS

KR    1020110096766 A    8/2011

OTHER PUBLICATIONS

"3M Optical Systems Vikuiti™ Dual Brightness Enchancement Film (DBEF)", http://multimedia.3m.com/mws/media/721798O/vikuititm-dual-brightness-enhancement-film-embossed-dbef.pdf?fn=DBEF_E_DS_7516882.pdf, Printed in the U.S.A., 3M© 2008, Accessed on Apr. 4, 2015.*

* cited by examiner

*Primary Examiner* — Frank Font
(74) *Attorney, Agent, or Firm* — Dentons US LLP

(57) ABSTRACT

Provided are a high luminance polarizing plate including a polarizing plate, a λ/2 retardation film having an in-plane retardation value ranging from 250 nm to 280 nm in a wavelength range of 450 nm to 650 nm that is laminated on one side of the polarizing plate, and a brightness enhancement film laminated on the λ/2 retardation film, a method of manufacturing the same, and a display device using the high luminance polarizing plate.

7 Claims, 2 Drawing Sheets

HIGH LUMINANCE POLARIZING PLATE, METHOD OF MANUFACTURING THE SAME, AND DISPLAY USING THE POLARIZING PLATE

CROSS-REFERENCE TO RELATED APPLICATIONS

This application claims the priority of Korean Patent Application Nos. 10-2012-0057582 filed on May 30, 2012 and 10-2013-0060151 filed on May 28, 2013, in the Korean Intellectual Property Office, the disclosure of which are incorporated herein by reference.

BACKGROUND OF THE INVENTION

1. Field of the Invention

The present invention relates to a high luminance polarizing plate used in a display device and a method of manufacturing the same, and more particularly, to a high luminance polarizing plate having improved color, white luminance, and contrast ratio characteristics through stacking a $\lambda/2$ retardation film having an in-plane retardation value ranging from 250 nm to 280 nm in a wavelength range of 450 nm to 650 nm and a brightness enhancement film, and a method of manufacturing a high luminance polarizing plate, in which the polarizing plate may be manufactured using a roll-to-roll process.

2. Description of the Related Art

In general, a polarizing plate is composed of a structure in which a triacetyl cellulose (TAC) film as a protective film is adhered to a polarizer having a structure in which polyvinyl alcohol (hereinafter, referred to as "PVA")-based molecular chains are aligned in a predetermined direction and an iodine-based compound or a dichroic polarizing material is included. The polarizer and the protective film are generally bonded with a water-based adhesive formed of a PVA-based aqueous solution.

In the case that a polarizing plate as described above is used in a liquid crystal display, a technique for improving brightness by attaching a brightness enhancement film, such as a Dual Brightness Enhancement Film (DBEF) by 3M, to one side of the polarizing plate has been suggested. However, in the case in which the brightness enhancement film is attached to a typical polarizing plate as described above, curling (hereinafter, referred to as "negative direction curling") may occur, in which a plane at the center of the polarizing plate is downwardly convex due to the difference of shrinkage between polarizing plate and the brightness enhancement film under room temperature condition. In the case that negative direction curling occurs in the polarizing plate, corners of a liquid crystal panel are lifted due to the curling of the polarizing plate, and may come into contact with a case when the liquid crystal panel is mounted on a module of the liquid crystal display. As a result, the corners of the liquid crystal panel may be highly stressed, and thus, a light leakage phenomenon may occur therefrom. The light leakage phenomenon from corners of the liquid crystal panel may be the primary cause of a defective image.

Also, with respect to a typical polarizing plate having the brightness enhancement film attached thereto, brightness is improved. However, since black luminance as well as white luminance may be increased, a contrast ratio may be decreased, and bluish color may be present due to a color-shift phenomenon caused by the brightness enhancement film. Thus, display characteristics may be degraded in comparison to the case of using the polarizing plate alone.

With respect to the brightness enhancement film that currently is produced, such as DBEF, a transmission axis is formed in a drawing direction, i.e., a machine direction (MD). In contrast, with respect to a polarizing plate manufactured by drawing after dyeing a PVA film with iodine, an absorption axis is formed in a drawing direction. Therefore, since the transmission axis of the brightness enhancement film is generally formed in a direction perpendicular to a transmission axis of the polarizing plate based on the MD, a roll-to-sheet process, in which the brightness enhancement film is cut to correspond to a size and shape of the polarizing plate, and the cut film is then attached to the polarizing plate such that the transmission axis of the polarizing plate is matched with the transmission axis of the brightness enhancement film, has been used in order to attach the brightness enhancement film to the polarizing plate. However, in the case that the brightness enhancement film is cut to correspond to the size and shape of a sheet and attached to the polarizing plate, the failure rate may increase, as a separate cutting process may be required, the introduction of bubbles and foreign matter may be facilitated, and accurate alignment may be required. Also, in the case of using the roll-to-sheet process, productivity may decrease, because the number of manufacturing processes, along with the required manufacturing time, may be increased in comparison to a roll-to-roll process in which films are stacked by unwinding the films in the state of a wound roll and then cut. Furthermore, since parts of the polarizing plate having no brightness enhancement film attached thereto are not recycled and wasted, the roll-to-sheet process is disadvantageous in terms of product yield. In contrast, in the case of using the roll-to-roll process, since the brightness enhancement film is attached to the entire side of the polarizing plate, the brightness enhancement film may be cut according to the desired size of the polarizing plate, and other portions remaining after cutting the large-sized polarizing plate may also be recycled as a small and medium-sized polarizing plate.

SUMMARY OF THE INVENTION

An aspect of the present invention provides a high luminance attachment-type polarizing plate, in which a roll-to-roll process may be used, a light leakage phenomenon at corners may be improved by reducing the occurrence of negative direction curling generated during the attachment of a brightness enhancement film, and a contrast ratio and color may be excellent, a method of manufacturing the same, and a display device using the polarizing plate.

According to an aspect of the present invention, there is provided a high luminance polarizing plate including: a polarizing plate; a $\lambda/2$ retardation film laminated on one side of the polarizing plate; and a brightness enhancement film laminated on the $\lambda/2$ retardation film, wherein the $\lambda/2$ retardation film has an in-plane retardation value ranging from 250 nm to 280 nm in a wavelength range of 450 nm to 650 nm.

According to another aspect of the present invention, there is provided a display device including the high luminance polarizing plate.

According to another aspect of the present invention, there is provided a method of manufacturing a high luminance polarizing plate including: laminating a $\lambda/2$ retardation film having an in-plane retardation value ranging from 250 nm to 280 nm in a wavelength range of 450 nm to 650 nm on one side of a polarizing plate; and laminating a brightness enhancement film on the $\lambda/2$ retardation film, wherein the method is performed using a roll-to-roll process.

In addition, the foregoing means to solve the objects do not list all characteristics of the present invention. Various characteristics of the present invention and the advantages and effects derivable therefrom may be understood in more detail with reference to the following specific embodiments.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
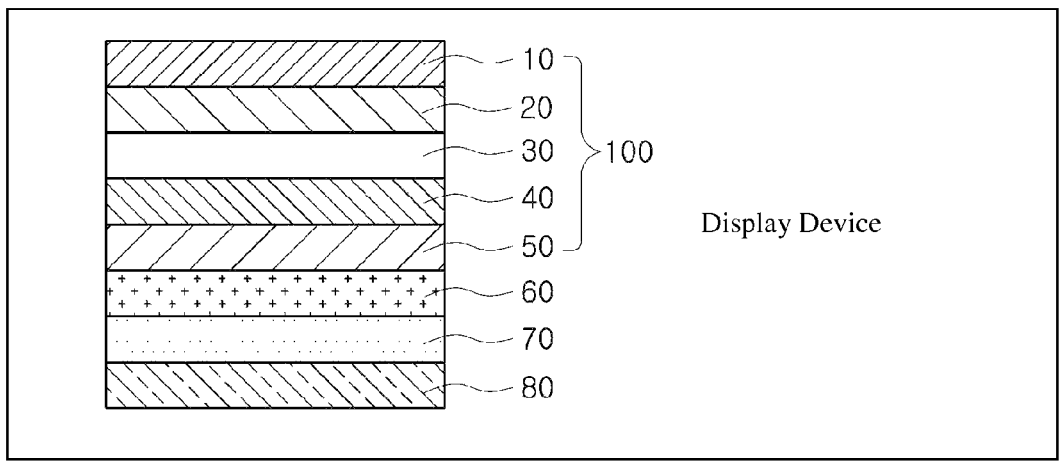
FIG. 1 illustrates a high luminance polarizing plate according to an embodiment of the present invention.

Hereinafter, the present invention will be described in more detail.

Hereinafter, the present invention will be described in more detail with reference to the accompanying drawings. However, the drawings attached to the specification are merely presented to exemplify the present invention, and the scope of the present invention is not limited thereto. In the drawings, some elements may be exaggerated, omitted, or schematically illustrated for convenience in description.

According to an embodiment of the present invention, provided is a high luminance polarizing plate including: a polarizing plate, a λ/2 retardation film laminated on one side of the polarizing plate, and a brightness enhancement film laminated on the λ/2 retardation film, wherein the λ/2 retardation film has an in-plane retardation value ranging from 250 nm to 280 nm in a wavelength range of 450 nm to 650 nm.

FIG. 1 schematically illustrates a structure of a high luminance polarizing plate according to an embodiment of the present invention. As illustrated in FIG. 1, the high luminance polarizing plate according to the present invention includes a polarizing plate 100, a λ/2 retardation film 70, and a brightness enhancement film 80.

The polarizing plate 100 may be formed by including a polarizer 30, protective films 10 and 50 attached to at least one side of the polarizer 30, and adhesive layers 20 and 40 disposed between the polarizer 30 and the protective films 10 and 50. In FIG. 1, the polarizing plate 100 is illustrated in which the adhesive layers 20 and 40 and the protective films 10 and 50 are formed on both sides of the polarizer 30. However, the polarizing plate of the present invention is not limited thereto. That is, the polarizing plate of the present invention includes a single-sided type polarizing plate, in which an adhesive layer and a protective film are formed only on one side of the polarizer 30, or a polarizing plate in which a protective film is directly formed on the polarizer not by forming an adhesive film, but by using a curable resin. In the case of using the single-sided type polarizing plate, the attachment of the λ/2 retardation film to a side having no protective film formed thereon may be more desirable for curling characteristics. However, the present invention is not limited thereto.

The polarizer 30 denotes an optical element only transmitting light having a specific polarizing state, wherein a PVA-based polarizing film, in which molecular chains containing an iodine-based compound or a dichroic dye are aligned in a predetermined direction, is generally used. Such polarizing film is prepared using a method in which a PVA-based film is dyed with iodine or a dichroic dye and then drawn in a predetermined direction and cross-linked. A degree of polymerization of the PVA is not particularly limited. However, the degree of polymerization may be in a range of about 1,000 to about 10,000 in consideration of freedom of molecular motion and smooth mixing with component materials, and for example, may be in a range of about 1,500 to about 5,000.

Next, the adhesive layers 20 and 40 are for bonding the protective films 10 and 50 and the polarizer 30, in which adhesives for a polarizing plate typically used in the art may be used without limitation. That is, an adhesive for forming the adhesive layers 20 and 40 of the present invention is not particularly limited so long as it has excellent optical transmission qualities and has no changes in yellowness over time. For example, the adhesive usable in the present invention may include adhesive resins including a PVA-based resin, an acrylic resin, a vinyl acetate-based resin, and/or an ultraviolet (UV)-curable resin. The adhesive resins may be a water-based adhesive or a solvent-free adhesive.

A curing initiator may be further added to the adhesive, if necessary. An azobisisobutyronitrile (AIBN)(2,2'-azo-bis (isobutyronitrile))-based initiator, a persulfate-based initiator, or an initiator of Darocure and/or Igacure series by Ciba-Geigy may be used as the curing initiator. Any water-based initiator known in the art may be used as the AIBN and persulfate-based initiators. Examples of the AIBN-based initiator may be 2,2'-azobis[2-(2-imidazolin-2-yl)propane]dihydrochloride, 2,2'-azobis[2-(2-imidazolin-2-yl)propane] disulfate dihydrate, 2,2'-azobis[N-(2-carboxyethyl)-2-methylpropionamide], 2,2'-azobis[2-(3,4,5,6-tetrahydropyrimidin-2-yl)propane]dihydrochloride, 2,2'-azobis{2-[1-(2-hydroxyethyl)-2-yl]propane}dihydrochloride, 2,2'-azobis{2-methyl-N-[2-(hydroxybutyl)]propionamide}, 2,2'-azobis[2-methyl-N-[2-(hydroxyethyl)propionamide], and 2,2'-azobis(N-butyl-2-methylpropionamide), and examples of the persulfate-based curing initiator may be potassium persulfate and ammonium persulfate. However, the present invention is not limited thereto. Examples of the initiator by Ciba-Geigy may be hydroxy-1-[4-(hydroxyethoxy)phenol]-2-methyl-1-propanone (Darocure 2959), 2-hydroxy-2-methyl-1-phenylpropan-1-one (Darocure 1173), 1-(4-isopropylphenyl)-2-hydroxy-2-methylpropan-1-one (Darocure 1116), a 25:75 blend of bis-(2,6-dimethoxybenzoyl)-2,4,4-trimethylpentyl phosphine oxide and 2-hydroxy-2-methyl-1-phenylpropan-1-one (Irgacure 1700), 1-[4-(2-hydroxyethoxy)-phenyl]-2-hydroxy-2-methyl-1-propan-1-one (Irgacure 2959), 1-hydroxy-cyclohexylphenylketone (Irgacure 184), and 2,2-dimethoxy-2-phenylacetophenone (Irgacure 651). However, the present invention is not limited thereto.

The curing initiator may be added in a maximum amount of 10 parts by weight, based on a total weight of the adhesive resin. The curing initiator is a component randomly added if necessary, in which a lower limit of the added amount is not limited. However, the curing initiator may be added in an amount ranging from 0.01 parts by weight to 10 parts by weight, for example, 0.01 parts by weight to 1 part by weight, based on the total weight of the adhesive. In the case that the amount of the added curing initiator satisfies the above range, progress of a curing reaction may be facilitated and adhesion may be further improved.

In addition, various coupling agents, tackifiers, UV absorbents, antioxidants, and various stabilizers may be mixed with the adhesive resin, if necessary.

As illustrated in FIG. 1, with respect to a two-sided type polarizing plate in which an adhesive layer and a protective film are formed on both sides of the polarizer, adhesive layers respectively formed on both sides of the polarizing plate may be formed of the same adhesive material or different adhesive materials. However, in consideration of productivity and curling characteristics, the adhesive layers formed on the both sides of the polarizer, for example, may be formed of the same adhesive resin. In the case that adhesive layers formed of the same material are formed on the both sides of the polarizer, since shrinkage rates of both adhesive layers are the same, forces acting on the polarizer after drying are the same. As a result, the occurrence of curling due to the shrinkage of the adhesive may be minimized.

Next, the protective films 10 and 50 as films for protecting the polarizer 30 are generally attached to the polarizer 30 by the medium of the adhesive layers 20 and 40. However, the present invention is not limited thereto, and the protective films 10 and 50 may be directly formed on the polarizer 30 without the adhesive layer. Random polymer films having excellent optical transparency, mechanical strength, thermal stability, and isotropy may be used as the protective films 10 and 50. Examples of the protective film usable in the present invention may be films formed of a polyester-based polymer such as polyethylene terephthalate and polyethylene naphthalate, a styrene-based polymer such as polystyrene and a copolymer of acrylonitrile and styrene, a cellulose-based polymer such as diacetyl cellulose and triacetyl cellulose, a polyethersulfone-based polymer, a polycarbonate-based polymer, an acrylic polymer such as polymethylmethacrylate, a polyolefin-based polymer, such as polyethylene, polypropylene, and a copolymer of ethylene and propylene, an amide-based polymer such as nylon or an aromatic polyamide, an imide-based polymer, a sulfone-based polymer, a polyether sulfone-based polymer, a polyether ether ketone-based polymer, a polyphenylene sulfide-based polymer, a vinyl alcohol-based polymer, a vinylidene chloride-based polymer, a vinyl butyral-based polymer, an arylate-based polymer, a polyoxymethylene-based polymer, an epoxy-based polymer, or a mixture thereof. However, the present invention is not limited thereto.

The protective films 10 and 50, if necessary, may be subjected to a surface modification treatment in order to improve adhesive strength and adhesion with respect to the polarizer. Specific examples of the surface treatment may be a corona treatment, a glow discharge treatment, a flame treatment, an acid treatment, an alkali treatment, a plasma treatment, an ultrasonic treatment, and a UV irradiation treatment. However, the present invention is not limited thereto. Also, a method of providing an undercoat layer to the protective film may be used in order to improve adhesiveness.

Next, the λ/2 retardation film 70 is for matching the transmission axes of the polarizing plate 100 and the brightness enhancement film 80. In the present invention, a film having an in-plane retardation value ranging from about 250 nm to about 280 nm, for example, about 260 nm to about 275 nm, or about 265 nm to about 275 nm, in a wavelength range of 450 nm to 650 nm may be used as the λ/2 retardation film 70. The in-plane retardation value $R_{in}(\lambda)$ denotes an in-plane retardation value measured at a wavelength of λ nm and denotes a value defined by the following Equation (1).

$$R_{in}(\lambda)=(n_x-n_y)\times d \quad \text{Equation (1)}$$

where $n_x$ is an in-plane refractive index of the λ/2 retardation film in a slow axis direction, $n_y$ is an in-plane refractive index of the λ/2 retardation film in a fast axis direction, and d is a thickness of the λ/2 retardation film.

According to the research of the present inventors, in the case that a film having an in-plane retardation value satisfying a specific value range (i.e., 250 nm to 280 nm) in an entire wavelength range of 450 nm to 650 nm is used as the λ/2 retardation film 70 as in the present invention, color, white luminance, and contrast ratio are significantly improved in comparison to the case of using a film having an in-plane retardation value deviating from the above value range.

Also, in the present invention, a maximum value of rate of change of the in-plane retardation value of the λ/2 retardation film 70 in a wavelength range of 450 nm to 650 nm may be 10% or less. In the case that the rate of change of the in-plane retardation value in a wavelength range of 450 nm to 650 nm is greater than 10%, color-shift may occur when the λ/2 retardation film 70 is applied to the polarizing plate, and thus, color of the polarizing plate may deteriorate. More specifically, in the case in which the λ/2 retardation film 70 satisfies the following Equations (2) and (3), an effect of inhibiting color-shift is particularly excellent.

$$0 \leq \{R_{in}(450)-R_{in}(550)\}/R_{in}(550) \leq 0.05 \quad \text{Equation (2)}$$

$$0 \leq \{R_{in}(550)-R_{in}(650)\}/R_{in}(550) \leq 0.05 \quad \text{Equation (3)}$$

where $R_{in}$ (450) is an in-plane retardation value at a wavelength of 450 nm, $R_{in}$ (550) is an in-plane retardation value at a wavelength of 550 nm, and $R_{in}$ (650) is an in-plane retardation value at a wavelength of 650 nm.

Materials typically used in a λ/2 retardation film known in the art may be used to form the λ/2 retardation film 70 without limitation. For example, triacetyl cellulose (TAC), a cycloolefin polymer (COP), an acrylic resin may be used. However, a COP film or an acrylic film may be used in terms of the fact that the realization of the above-described retardation characteristics may be relatively facilitated and the occurrence of curling may be less frequent due to a low water vapor transmission rate.

In the polarizing plate of the present invention, the λ/2 retardation film 70 is laminated to have an optical axis disposed at an angle ranging from 40° to 50°, for example, at an angle of 45° with respect to a transmission axis of the polarizer. As described above, since transmission axes of typical polarizing films and brightness enhancement films, currently commercially available, are respectively disposed in the directions of shrinkage in the state of original films having the shape of a wound roll, a roll-to-roll process using the original films having the shape of a wound roll has not been used so far, when the polarizing plate and the brightness enhancement film are laminated. Instead, a roll-to-sheet process has been used, in which a wound roll of the polarizing plate is used and the brightness enhancement film in the form of a cut sheet is used. However, in the present invention, since the λ/2 retardation film having an optical axis disposed at an angle ranging from 40° to 50° with respect to an absorption axis of the polarizer is inserted between the polarizing plate and the brightness enhancement film, linearly polarized light passed through the transmission axis of the brightness enhancement film is allowed to be rotated into linearly polarized light transmitting through the transmission axis of the polarizing plate. As a result, the polarizing plate and the brightness enhancement film may be laminated through a roll-to-roll process without using a cutting process. In order for the λ/2 retardation film to sufficiently perform a function of matching the transmission axes of the polarizing plate and the brightness enhancement film, the λ/2 retardation film may be laminated to have an optical axis disposed at an angle ranging from 40° to 50° with respect to the transmission axis of the polarizer.

Next, the brightness enhancement film 80 is for improving the brightness of the polarizing plate, in which brightness enhancement films typically used in the art, for example, a multilayer reflective polarizer, such as a dual brightness enhancement film (DBEF) manufactured and sold by 3M, a multilayer reflective film in which a plurality of layers formed of materials having different refractive indices are sequentially stacked, or a nanowire grid polarizer, may be used without limitation.

For example, one layer of the multi reflective film has an isotropic structure, and another layer of the multi reflective film has an anisotropic structure, wherein the multi reflective film may have a structure in which a layer having a reflective index in one direction higher than a refractive index of the layer having the isotropic structure is sequentially stacked.

Also, the nanowire grid polarizer may have a shape in which a nanostructure is formed on a transparent film. The nanostructure may be a metal layer or may have a shape in which a metal layer is formed on a resin pattern.

In the present invention, the brightness enhancement film 80 may be laminated to have the transmission axis disposed at an angle ranging from 85° to 95° with respect to the transmission axis of the polarizing plate and at an angle ranging from 40° to 50°, for example, at an angle of 45° with respect to the optical axis of the λ/2 retardation film 70.

The high luminance polarizing plate of the present invention may further include at least one or more adhesive layers 60, if necessary. The adhesive layers are formed between the polarizing plate and the λ/2 retardation film, and/or the λ/2 retardation film and the brightness enhancement film. Thus, the adhesive layers may act to bond the polarizing plate, the λ/2 retardation film, and the brightness enhancement film to one another.

Figure 2:
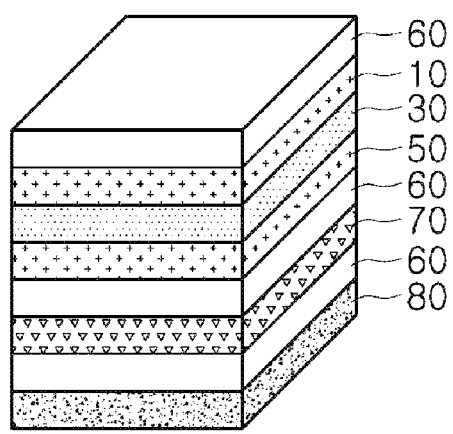
FIG. 2 illustrates a high luminance polarizing plate according to another embodiment of the present invention.

Also, as illustrated in FIG. 2, the adhesive layers may function as the adhesive layers 60 for bonding with a liquid crystal panel by being formed on outermost surfaces of the high luminance polarizing plate.

The adhesive layers 60 may be formed by using adhesives typically used in the art, and a material thereof is not particularly limited. For example, an acrylic resin, an epoxy resin, a polyurethane resin, a silicon resin, a polyether resin, a polyamide resin, and a PVA resin may be used alone or in a mixture thereof as the adhesive. Among the above resins, an acrylic resin adhesive in particular may be used in consideration of transparency, weather resistance, durability, and adhesiveness properties thereof.

Next, a method of manufacturing a high luminance polarizing plate of the present invention will be described.

The method of manufacturing a high luminance polarizing plate of the present invention includes (a) laminating a λ/2 retardation film having an in-plane retardation value ranging from 250 nm to 280 nm in a wavelength range of 450 nm to 650 nm on one side of a polarizing plate and (b) laminating a brightness enhancement film on the λ/2 retardation film, wherein the method is performed using a roll-to-roll process.

The polarizing plate, the λ/2 retardation film, and the brightness enhancement film are all used in the state of films having the form of a long sheet unwound from the original films having the form of a wound roll, i.e., in the state of uncut films. In addition, since detailed descriptions related to the polarizing plate, the λ/2 retardation film, and the brightness enhancement film are the same as described above, detailed descriptions thereof will be omitted.

Operation (a) of the laminating of the λ/2 retardation film having an in-plane retardation value ranging from 250 nm to 280 nm in a wavelength range of 450 nm to 650 nm on the one side of the polarizing plate may be performed by using various methods of laminating a film well known in the art, and the method thereof is not particularly limited. For example, in the present invention, operation (a) may be performed in such a manner that an adhesive layer is disposed between the polarizing plate and the λ/2 retardation film, and the polarizing plate and the λ/2 retardation film are then pressurized by using a laminator. The adhesive layer may be formed according to a method of forming an adhesive layer well known in the art, and the method thereof is not particularly limited. For example, the adhesive layer may be formed using a method of coating one side of the polarizing plate or the λ/2 retardation film with an adhesive resin or attaching an adhesive film to the one side of the polarizing plate or the λ/2 retardation film, or a method of injecting an adhesive resin between the polarizing plate and the λ/2 retardation film during the lamination and then curing the adhesive resin.

In operation (a), the λ/2 retardation film may be laminated to have an optical axis disposed at an angle ranging from 40° to 50° with respect to the transmission axis of the polarizing plate. In the case that the optical axis of the λ/2 retardation film and the transmission axis of the polarizing plate are disposed to satisfy the above angle range, an effect of optical rotation due to the λ/2 retardation film may be sufficiently obtained. With respect to a commercially available typical polarizing plate, since a transmission axis is aligned in a winding direction of a roll (i.e., machine direction (MD)), the polarizing plate and the λ/2 retardation film may be laminated to have the above angle range by using a film having an optical axis disposed at an angle ranging from 40° to 50° with respect to the winding direction of the roll (MD) as the λ/2 retardation film.

Operation (b) of the laminating of the brightness enhancement film on the λ/2 retardation film may also be performed by using various methods of laminating a film well known in the art, and the method thereof is not particularly limited. For example, operation (b) may be performed in such a manner that an adhesive layer is disposed between the λ/2 retardation film and the brightness enhancement film, and the λ/2 retardation film and the brightness enhancement film are then pressurized by using a laminator. As described in operation (a), the adhesive layer may be formed according to a method of forming an adhesive layer that is well known in the art, and the method thereof is not particularly limited.

Operation (a) and operation (b) may be simultaneously or sequentially performed. For example, in the case that operation (a) and operation (b) are simultaneously performed, operations (a) and (b) are performed in such a manner that the polarizing plate, the λ/2 retardation film, and the brightness enhancement film are disposed in this sequence, an adhesive resin is injected between each film, and the polarizing plate, the λ/2 retardation film, and the brightness enhancement film are then laminated simultaneously using a laminator, or an adhesive film is attached to at least one side of the polarizing plate, the λ/2 retardation film, and/or the brightness enhancement film, and the polarizing plate, the λ/2 retardation film, and the brightness enhancement film are then laminated by using a laminator after the polarizing plate, the λ/2 retardation film, and the brightness enhancement film are disposed in this sequence.

In operation (b), the brightness enhancement film may be laminated to have a transmission axis disposed at an angle ranging from 85° to 95° with respect to the transmission axis of the polarizing plate and at an angle ranging from 40° to 50° with respect to the optical axis of the λ/2 retardation film 70.

Different from a typical brightness enhancement film-attached polarizing plate, the high luminance polarizing plate of the present invention manufactured by the above method may improve a light leakage phenomenon at corners, because positive direction curling occurs in which a plane at the center of the polarizing plate is convex upward after the attachment of the brightness enhancement film. Also, a high luminance polarizing plate having significantly improved white luminance and contrast ratio may be obtained.

Furthermore, the high luminance polarizing plate of the present invention may not only have excellent color and contrast ratio in comparison to a typical polarizing plate, but may also be manufactured through a roll-to-roll process. Thus, the high luminance polarizing plate of the present invention may be manufactured simply and in a short period of time.

The high luminance polarizing plate of the present invention may be suitable for various display devices, such as a liquid crystal display and an organic electroluminescence (EL) device. The liquid crystal display may be used in various driving modes, for example, an in-plane switching (IPS) mode, a twisted nematic (TN) mode, a vertically aligned (VA) mode, or a fringe field switching (FFS) mode, without limitation.

Hereinafter, the present invention will be described in detail, according to specific examples. However, the following examples are merely provided to allow for a clearer understanding of the present invention, rather than to limit the scope thereof.

EXAMPLE

A PVA film (Kurary Co. Ltd., degree of polymerization: 2,400) was passed through a washing tank and a swelling tank, and dyed in an aqueous solution including $I_2$ and KI. Then, a polarizer film was obtained by drawing the PVA film 5 times in an aqueous solution containing boric acid and KI.

60 μm thick TAC films were disposed on both sides of the polarizer film, a PVA-based adhesive aqueous solution was injected between the polarizer and the TAC film, and a polarizing plate having protective films attached on the both sides thereof was then obtained by being laminated with a laminator and dried at 80° C. for 8 minutes. A polarizing plate having the shape of a wound roll was obtained by winding the polarizing plate.

Next, an adhesive film was attached while a λ/2 retardation film in the state of a wound roll was unwound, and the λ/2 retardation film was rewound to obtain a wound roll of a λ/2 retardation film having an adhesive layer formed thereon. A film having an optical axis disposed at an angle of 45° with respect to a transmission axis of the polarizing plate and having an in-plane retardation value as described in the following Table 1 was used as the λ/2 retardation film.

Also, an adhesive film was attached while a DBEF film in the state of a wound roll by 3M was unwound, and the DBEF film was rewound to obtain a wound roll of a brightness enhancement film having an adhesive layer formed thereon. A transmission axis of the brightness enhancement film was disposed at an angle of 90° with respect to the transmission axis of the polarizing plate.

The polarizing plate, the λ/2 retardation film, and the brightness enhancement film having the shape of a wound roll were disposed in this sequence, and release films adhered to the adhesive layers of the λ/2 retardation film and the brightness enhancement film were then removed while the films were unwound from the wound rolls. Then, the polarizing plate, the λ/2 retardation film, and the brightness enhancement film were laminated by passing the films through a laminator. Thereafter, the polarizing plate having the λ/2 retardation film and the brightness enhancement film laminated thereon was cut to a size of 20 cm×20 cm to manufacture a high luminance polarizing plate.

Comparative Example 1

For comparison, a DBEF film by 3M was cut and then attached to one side of a polarizing plate manufactured in the same manner as Example so as to match a transmission axis of the polarizing plate and a transmission axis of the DBEF film. A λ/2 retardation film was not included between the polarizing plate and the DBEF film.

Comparative Example 2

A polarizing plate was manufactured in the same manner as the Example, except that a film having an in-plane retardation value as described in the following Table 1 was used as a λ/2 retardation film.

Comparative Example 3

A polarizing plate was manufactured in the same manner as the Example, except that a film having an in-plane retardation value as described in the following Table 1 was used as a λ/2 retardation film.

TABLE 1

| Category | 450 nm | 550 nm | 650 nm |
| --- | --- | --- | --- |
| Example | 272.2 | 271.9 | 270.1 |
| Comparative Example 2 | 242.1 | 241.8 | 240.5 |
| Comparative Example 3 | 211.5 | 211.2 | 210.1 |

Experimental Example 1

Contrast Ratio Measurement

The polarizing plates manufactured according to Example, and Comparative Examples 1 to 3 were mounted on an IPS display device, and contrast ratios were then measured. The results thereof are presented in FIG. 3. A contrast ratio (hereinafter, referred to as "CR") of a display device denotes sharpness of a display, in which the contrast ratio is represented by a ratio of white luminance ($L_w$) and black luminance ($L_b$) generated by the display device, i.e., $L_w/L_b$, and optical performance of the display device is better as the display device has a higher CR. In general, the $L_w$ and the $L_b$ are measured by using a luminance meter, and a measurement system used in the present invention was RISA COLOR ONE-II.

Figure 3:
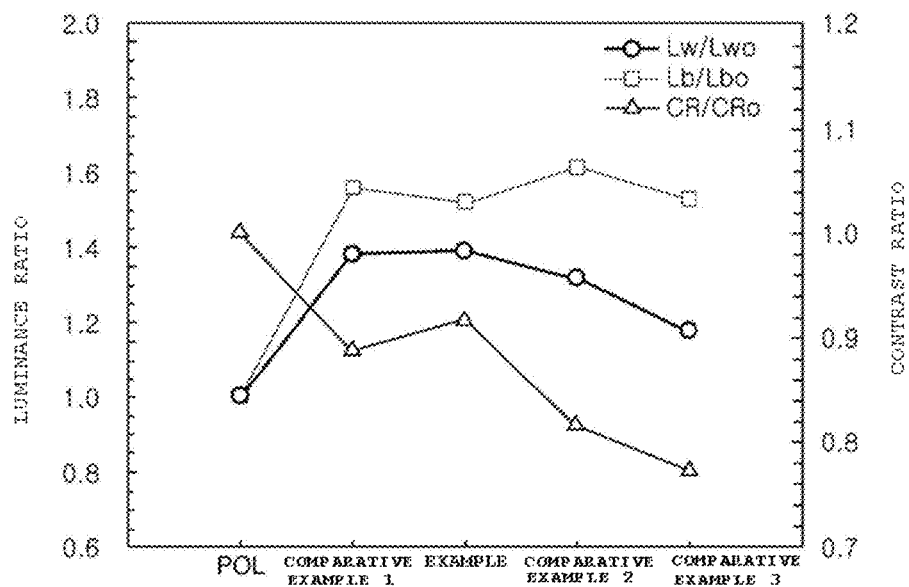
FIG. 3 illustrates the results of measuring contrast ratios after polarizing plates manufactured according to Examples and Comparative Examples 1 to 3 are mounted on a lateral electric field type display device.

In FIG. 3, $L_{wo}$ denotes a white luminance value measured in the case of using a polarizing plate having no brightness enhancement film attached thereto, $L_w$ denotes white luminance values measured in the cases of using the polarizing plates of Example and Comparative Examples 1 to 3, $L_{bo}$ denotes a black luminance value measured in the case of using the polarizing plate having no brightness enhancement film attached thereto, and $L_b$ denotes black luminance values measured in the cases of using the polarizing plates of Example and Comparative Examples 1 to 3. Also, $CR_o$ denotes a contrast ratio in the case of using the polarizing plate having no brightness enhancement film attached thereto, and CR denotes contrast ratios measured in the cases of using the polarizing plates of Example and Comparative Examples 1 to 3.

Referring to FIG. 3, it may be understood that, in the case of using the polarizing plate according to Example, a better contrast ratio was obtained in comparison to the cases of using the polarizing plates of Comparative Examples 1 to 3. This may be due to the fact that an increase amount of black luminance of the polarizing plate of Example was relatively smaller than those of the polarizing plates of Comparative Examples 1 to 3.

Experimental Example 2

Curling Occurrence Measurement

Figure 4:
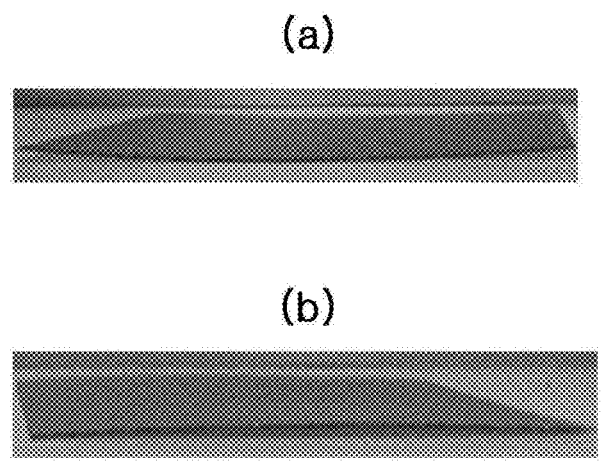
FIG. 4(a) is a photograph illustrating the degree of curling in the polarizing plate manufactured according to Comparative Example 1.
FIG. 4(b) is a photograph illustrating the degree of curling in the polarizing plate manufactured according to Example.

Degrees of curling in the polarizing plates manufactured in Example and Comparative Example 1 were visually observed. FIG. 4(a) is a photograph illustrating the degree of the occurrence of curling in the polarizing plate manufactured according to Comparative Example 1, and FIG. 4 (b) is a photograph illustrating the degree of the occurrence of curling in the polarizing plate manufactured according to Example. Referring to FIGS. 4(a) and 4(b), it may be understood that the polarizing plate of Comparative Example 1 exhibited (−) curling, but (+) curling was formed in the polarizing plate of Example. Thus, the polarizing plate of the present invention may improve a light leakage phenomenon at corners, because the positive direction curling occurred after the attachment of the brightness enhancement film.

Experimental Example 3

Color Measurement x and y, orthogonal colors in a Commission Internationale de l'Eclairage (CIE) color coordinate system of the polarizing plates manufactured according to Example and Comparative Examples 1 to 3, were measured by using RISA COLOR ONE-II. A value of x is an index representing green-red colors, in which the larger the value of x is, the stronger the red color is. A value of y is an index representing blue-yellow colors, in which the larger the value of y is, the stronger the yellow color is.

The measurement results thereof are presented in Table 2 below.

TABLE 2

| Category | x | y |
| --- | --- | --- |
| Example | 0.244 | 0.274 |
| Comparative Example 1 | 0.233 | 0.245 |
| Comparative Example 2 | 0.236 | 0.264 |
| Comparative Example 3 | 0.232 | 0.254 |

As illustrated in Table 2, it may be understood that, with respect to the polarizing plate of Example, the value of y was higher than those of the polarizing plates of Comparative Examples 1 to 3. This means that a bluish color was weaker in the case of using the polarizing plate of Example. It was also visually confirmed that the darkest black color was achieved in the case of using the polarizing plate of the Example.

Different from a typical brightness enhancement film-attached polarizing plate, a high luminance polarizing plate of the present invention, in which a λ/2 retardation film is inserted between a brightness enhancement film and the polarizing film, has positive direction curling in which a plane at the center of the polarizing plate is convex upward after the attachment of the brightness enhancement film, and thus, a light leakage phenomenon at corners may be improved.

Also, the high luminance polarizing plate of the present invention may have significantly improved contrast ratio characteristics in comparison to those of a typical high luminance polarizing plate by using a λ/2 retardation film having an in-plane retardation value ranging from 250 nm to 280 nm in a wavelength range of 450 nm to 650 nm, and may allow to achieve darker and sharper black color by inhibiting the generation of bluish color.

Furthermore, the present invention may allow a high luminance polarizing plate to be manufactured through a roll-to-roll process without cutting a brightness enhancement film by inserting a λ/2 retardation film performing an optical rotation function between the polarizing plate and the brightness enhancement film. As a result, the occurrence of failures due to the introduction of bubbles and foreign matter, and an alignment process may be reduced, and productivity may be improved.

While the present invention has been shown and described in connection with the exemplary embodiments, it will be apparent to those skilled in the art that modifications and variations can be made without departing from the spirit and scope of the invention as defined by the appended claims.

What is claimed is:

1. A high luminance polarizing plate comprising:
    a polarizing plate;
    a λ/2 retardation film laminated on one side of the polarizing plate; and
    a brightness enhancement film laminated on the λ/2 retardation film,
    wherein the λ/2 retardation film has an in-plane retardation value ranging from 250 nm to 280 nm in a wavelength range of 450 nm to 650 nm,
    wherein the λ/2 retardation film satisfies Equations (2) and (3) below, and
    wherein the brightness enhancement film is laminated to have a transmission axis disposed at an angle ranging from 85° to 95° with respect to the transmission axis of the polarizing plate and at an angle ranging from 40° to 50° with respect to the optical axis of the λ/2 retardation film, $$0 \leq \{R_{in}(450) - R_{in}(550)\}/R_{in}(550) \leq 0.05, \qquad \text{Equation (2)}$$

and $$0 \leq \{R_{in}(550) - R_{in}(650)\}/R_{in}(550) \leq 0.05, \qquad \text{Equation (3)}$$

where $R_{in}(450)$ is an in-plane retardation value at a wavelength of 450 nm, $R_{in}(550)$ is an in-plane retardation value at a wavelength of 550 nm, and $R_{in}(650)$ is an in-plane retardation value at a wavelength of 650 nm.

2. The high luminance polarizing plate of claim 1, wherein the λ/2 retardation film is laminated to have an optical axis disposed at an angle ranging from 40° to 50° with respect to a transmission axis of the polarizing plate.

3. The high luminance polarizing plate of claim 1, wherein the brightness enhancement film is a dual brightness enhancement film.

4. The high luminance polarizing plate of claim 3, wherein the dual brightness enhancement film is a film in which a plurality of layers formed of materials having different refractive indices are sequentially stacked.

5. A display device including the high luminance polarizing plates of any one of claims 1, 2, 3, and 4.

6. A method of manufacturing a high luminance polarizing plate, the method comprising:
- laminating a λ/2 retardation film having an in-plane retardation value ranging from 250 nm to 280 nm in a wavelength range of 450 nm to 650 nm on one side of a polarizing plate; and
- laminating a brightness enhancement film on the λ/2 retardation film, wherein the method is performed using a roll-to-roll process, wherein the λ/2 retardation film satisfies Equations (2) and (3) below, and wherein, in the laminating of the brightness enhancement film, the brightness enhancement film is laminated to have a transmission axis disposed at an angle ranging from 85° to 95° with respect to the transmission axis of the polarizing plate and at an angle ranging from 40° to 50° with respect to the optical axis of the λ/2 retardation film, $$0 \leq \{R_{in}(450) - R_{in}(550)\}/R_{in}(550) \leq 0.05, \quad \text{Equation (2)}$$

and $$0 \leq \{R_{in}(550) - R_{in}(650)\}/R_{in}(550) \leq 0.05, \quad \text{Equation (3)}$$

where $R_{in}(450)$ is an in-plane retardation value at a wavelength of 450 nm, $R_{in}(550)$ is an in-plane retardation value at a wavelength of 550 nm, and $R_{in}(650)$ is an in-plane retardation value at a wavelength of 650 nm.

7. The method of claim 6, wherein, in the laminating of the λ/2 retardation film, the λ/2 retardation film is laminated to have an optical axis disposed at an angle ranging from 40° to 50° with respect to a transmission axis of the polarizing plate.

* * * * *